United States Patent [19]
Jackowski et al.

[11] Patent Number: 5,303,351
[45] Date of Patent: Apr. 12, 1994

[54] ERROR RECOVERY IN A MULTIPLE CHANNEL COMPUTER SYSTEM

[75] Inventors: Stefan P. Jackowski; Ronald B. Jenkins, both of Endicott, N.Y.

[73] Assignee: International Business Machines Corporation, Armonk, N.Y.

[21] Appl. No.: 856,832

[22] Filed: Mar. 23, 1992

Related U.S. Application Data

[60] Continuation of Ser. No. 554,120, Jul. 18, 1990, which is a division of Ser. No. 292,279, Dec. 30, 1988.

[51] Int. Cl.$^5$ ............................................. G06F 13/14
[52] U.S. Cl. ................................. 395/275; 364/266.5; 364/945
[58] Field of Search .............. 395/275; 364/948, 266.8

[56] References Cited

U.S. PATENT DOCUMENTS

| | | | |
|---|---|---|---|
| H696 | 10/1989 | Davidson | 364/900 |
| 676,707 | 9/1887 | Brunelle et al. | |
| 791,186 | 4/1877 | Miyazaki | |
| 3,553,656 | 1/1971 | Bernhardt | 364/900 |
| 3,564,502 | 2/1971 | Boehner et al. | 364/200 |
| 3,721,961 | 3/1973 | Edstrom | 364/200 |
| 3,825,701 | 7/1974 | Jacobs | 179/175.23 |
| 4,017,828 | 4/1977 | Watanabe et al. | 340/146.1 BE |
| 4,130,864 | 12/1978 | Schlotterer | 364/200 |
| 4,205,374 | 5/1980 | Bardsley, III et al. | 364/200 |
| 4,257,095 | 3/1981 | Nadir | 364/200 |
| 4,314,335 | 2/1982 | Pezzi | 364/200 |
| 4,381,540 | 4/1983 | Lewis et al. | 364/200 |
| 4,400,771 | 8/1983 | Suzuki et al. | 364/200 |
| 4,485,472 | 11/1984 | Sproull et al. | 371/15 |
| 4,493,036 | 1/1985 | Boudreau et al. | 364/200 |
| 4,511,969 | 4/1985 | Koenig et al. | 364/200 |
| 4,637,012 | 1/1987 | Crabbe | 370/24 |
| 4,649,475 | 3/1987 | Scheuneman | 364/200 |
| 4,672,535 | 6/1987 | Katzmann et al. | 364/200 |
| 4,672,537 | 6/1987 | Katzman et al. | 364/200 |
| 4,716,523 | 12/1987 | Burrus, Jr. et al. | 364/200 |
| 4,805,090 | 2/1989 | Coogan | 364/200 |
| 4,821,170 | 4/1989 | Bernick et al. | 364/200 |
| 4,837,675 | 6/1989 | Bean et al. | 364/200 |
| 4,868,742 | 9/1989 | Gant et al. | 364/200 |
| 5,119,488 | 6/1992 | Takamatsu | |
| 5,133,071 | 7/1992 | Sato et al. | 395/700 |

FOREIGN PATENT DOCUMENTS 7907467  3/1979  United Kingdom.

OTHER PUBLICATIONS

I.B.M. Technical Disclosure Bulletin, vol. 29, No. 9 dated Feb. 1987 (1 page).
IBM Technical Disclosure Bulletin vol. 26, No. 8, Jan., 1984, pp. 4275-4276 "Deferred 'Disconnect In'".

*Primary Examiner*—Dale M. Shaw
*Assistant Examiner*—C. Shin
*Attorney, Agent, or Firm*—Baker, Maxham, Jester & Meador

[57] ABSTRACT

The I/O configuration of a computer system includes two channels which are capable of being available on up to four interface ports, with the ports being incorporated within the channel in order to eliminate the need for an external switch. Control means are provided for monitoring the status of each channel and each port in order to achieve expeditious transfers through a selected port between the channel and peripheral devices. Error reporting is limited to the area directly affected by the error, and immediate disconnection helps to isolate the error and allow time for error recovery before the particular channel or port again becomes available.

5 Claims, 11 Drawing Sheets

PORT CONNECTION ROUTINE PG. 1 OF 2

FIG. 4

FORMAT OF TRANSMISSION FRAMES
FIG.5

TYPES OF CHANNEL CONNECTIONS

| EVENTS | INACT | CHANNEL CONNECTION | | | | ERROR RECOVERY | | |
|---|---|---|---|---|---|---|---|---|
| | | SMPLX T (ST) | SMPLX R (SR) | DUPLX 1 (D1) | DUPLX 2 (D2) | PD XMIT (ER1) | PD REC (ER2) | PDR REC (ER3) |
| REC CS-PE (1) | SR | D2 | DN | DN | DN | /// | /// | /// |
| NO CHNL CONN NOTE1 | SR NOTE2 | /// | ER1 NOTE3 | /// | /// | DN | DN | DN |
| REC CS-DE (2) | DN | IN | IN | IN | D1 | /// | /// | /// |
| NO CHNL CONN | ER1 | /// | ER1 | /// | /// | DN | DN | DN |
| REC CS-CS, PS CS-AE (3) | SR | D2 | DN | DN | DN | /// | /// | /// |
| NO CHNL CONN | ER1 | /// | ER1 | /// | /// | DN | DN | DN |
| REC CS-ERROR (4) | SR | D2 | DN | DN | DN | /// | /// | /// |
| NO CHNL CONN | SR NOTE2 | /// | ER1 | /// | /// | DN | DN | DN |
| REC PS-PE (5) CHNL CONNECT NOTE4 | ER1 | D1 | DN | DN | DN | /// | /// | /// |
| NO CHNL CONN | ER1 | /// | ER1 | /// | /// | DN | DN | DN |

FIG. 7

| | FIG. 7A |
|---|---|
| | FIG. 7B |

INTERNAL CHANNEL SWITCH STATES

FIG. 7B

| | | | | | | | |
|---|---|---|---|---|---|---|---|
| REC PS-DE (6) CHNL CONNECT / NO CHNL CONN | ER1 / ER1 | IN / /// | IN / ER1 | IN / /// | D1 / /// | /// / DN | /// / DN | /// / DN |
| REC PS-AE (7) CHNL CONNECT / NO CHNL CONN | ER1 / ER1 | D1 / /// | DN / ER1 | DN / /// | DN / /// | /// / DN | /// / DN | /// / DN |
| REC PS-ERROR (8) CHNL CONNECT / NO CHNL CONN | ER1 / ER1 | D1 / /// | DN / ER1 | DN / /// | DN / /// | | | |
| XMT CS-PE (9) | ST | DN | D2 | DN | DN | /// / DN | /// / DN | /// / DN |
| XMT PS-PE (10) | /// | DN | D1 | D1 | D1 | /// | /// | /// |
| XMT PS-DE (11) REC DE (12) CHNL CONNECT / NO CHNL CONN | /// / ER1 | IN / IN | IN / ER1 | IN / IN | D1 / /// | /// / DN | /// / DN | /// / DN |
| CHNL CONNECT / NO CHNL CONN | ER1 / ER1 | IN / IN | IN / ER1 | IN / IN | D1 / /// | /// / DN | /// / DN | /// / DN |

| EVENTS | INACT (IN) | CHANNEL CONNECTION | | | | ERROR RECOVERY | | |
|---|---|---|---|---|---|---|---|---|
| | | SMPLX T (ST) | SMPLX R (SR) | DUPLX 1 (D1) | DUPLX 2 (D2) | PD XMIT (ER1) | PD REC (ER2) | PDR REC (ER3) |
| REC PD (13) | ER2 | ER2 | ER2 | ER2 | ER2 | ER2 | DN | ER2 |
| REC PDR (14) | ER3 | ER3 | ER3 | ER3 | ER3 | ER3 | ER3 | DN |
| XMIT PD (15) | ER1 | ER1 | ER1 | ER1 | ER1 | DN | ER1 | ER1 |
| REC IDLES (16) | DN | DN | DN | DN | DN | DN | IN | IN |

DN – DO NOTHING.
CS – CONNECT START (A FRAME WHICH INITIATES A CONNECTION).
PS – PASSIVE START (A FRAME WHICH LEAVES THE CONNECTION AS IS).
PE – PASSIVE END (A FRAME WHICH LEAVES THE CONNECTION AS IS).
DE – DISCONNECT END (A FRAME WHICH REMOVES A CONNECTION).
AE – ABORT END (A FRAME WHICH IS ABORTED).
/// – THE COMBINATION OF THIS EVENT AND THIS STATE IS IMPOSSIBLE.
IDLES – CHARACTERS INDICATING THE INTERFACE IS INACTIVE.

PD XMIT(ER1)   –PORT DISCONNECT TRANSMIT STATE.

PD REC(ER2)    –PORT DISCONNECT RECEIVE STATE.

PDR REC(ER3)   –PORT DISCONNECT RESPONSE RECEIVE STATE.

INACT(IN)      –INACTIVE STATE.

RC OR REC – RECEIVE.
XM,XMT OR XMIT – TRANSMIT.
CHNL CONNECT – THE CHANNEL IS ALREADY CONNECTED TO THE PORT.
NO CHNL CONNECT – THE PORT HARDWARE WILL RESPOND TO THE EVENT BECAUSE NO CONNECTION HAS BEEN MADE TO THE CHANNEL.

INTERNAL CHANNEL SWITCH STATES

FIG.8

ERROR RECOVERY IN A MULTIPLE 170 CHANNEL COMPUTER SYSTEM

This invention relates generally to I/O channels in a computer system, and more particularly to a multiple channel configuration capable of switching its availability for connection with a multiple number of interface ports.

This is a continuation (FILE WRAPPER) of application Ser. No. 07/554,120 filed Jul. 18, 1990, which is a division, of application Ser. No. 07/292,279, filed Dec. 19, 1988.

BACKGROUND OF THE INVENTION

It is common practice in a computer system to have a number of I/O peripheral devices connected through one or more channels to computer systems. This is true with respect to main frame, mid-size and micro-computers. Typically, there are more I/O devices used with a computer than channel interfaces, so in the past it has been necessary to provide an external switch to selectively connect individual I/O devices to a channel as the need arises, or a "daisy chain" of the devices. Also, there was a trend toward having multiple channels to facilitate the various transfers of data back and forth between the computer system and the I/O devices such as printers, terminals, external storage, and the like. Of course, adding additional channels and/or providing an external switch can be expensive. Moreover, when an error occurred anywhere in the system, it was reported as immediate and damaging without regard to where the error had arisen. As a result, overall machine availability was adversely affected even though the area where the error arose was not in use at the time. Thus there is a need to accommodate a growing number of I/O devices without increasing the manufacturing and maintenance expenses of the system, and without proliferating the number of channels required. And when an error occurs, it would be desirable to isolate the error immediately and report it to the rest of the system only to the extent the rest of the system is affected.

OBJECTS AND SUMMARY OF THE INVENTION

It is a primary object of the invention to provide maximum flexibility in the attachment of multiple interfaces to a multiple number of channels through a number of interface ports which are connected to the I/O peripheral devices. A related object is to provide a connection scheme which does not allow simultaneous usage of a channel by more than one interface port, but which allows all of the channels to have the capability of talking to any of the existing ports.

Another object in order to achieve flexibility is to allow connections and disconnections to be made from either the interface or from the channel.

A further object in order to increase the efficiency of the internal operation of the computer system is to have channel-initiated requests for connection be given priority over device-initiated requests for connection.

Still another object of the invention is to provide a priority scheme to prevent a single interface from excluding other interfaces from gaining access to the channel.

Yet another object is to eliminate the need for an external switch by providing a plurality of ports which are internal to the channel and are actually part of the channel.

Another important object is to have each port isolated from each other so that errors are reported only to the areas affected by the errors. A related object is to provide immediate disconnection between a port and a channel upon detection of an error so that the error can be isolated.

Another object is to isolate the ports, and thus any device, from maintenance or diagnostic functions (e.g., scanning the logic), which require machine clocks to be stopped in the channel subsystem, and to allow for a smooth recovery from this condition once clocks are started again.

An additional object is to report port checks independently of channel checks in order to free the channel from taking the time to recover from errors on ports which are not conversing with the channel.

Accordingly, the invention provides two channels which are capable of being available on up to four interface ports, with the ports being incorporated within the channel in order to eliminate the need for an external switch. Error reporting is limited to the area directly affected by the error, and immediate disconnection helps to isolate the error and allow time for error recovery before the particular channel or port again becomes available.

Although specific objects and summaries of the important features of this invention have been set forth above, it is understood that the scope of the invention will become apparent from the description given hereinafter and from the accompanying drawings. However, it should be understood that the details in this invention specification are given by way of example and illustration only, and various changes and modifications will become apparent to those skilled in the art, all within the spirit of the invention.

BRIEF DESCRIPTION OF DRAWINGS

FIG. 7 shows how the FIGS. 7A and 7B are connected;

DETAILED DESCRIPTION OF PREFERRED EMBODIMENT

Figure 1:
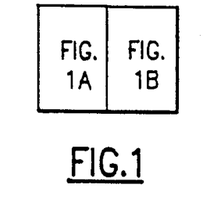
FIG. 1 shows how the FIGS. 1A and 1B are connected.
Figure 1A:
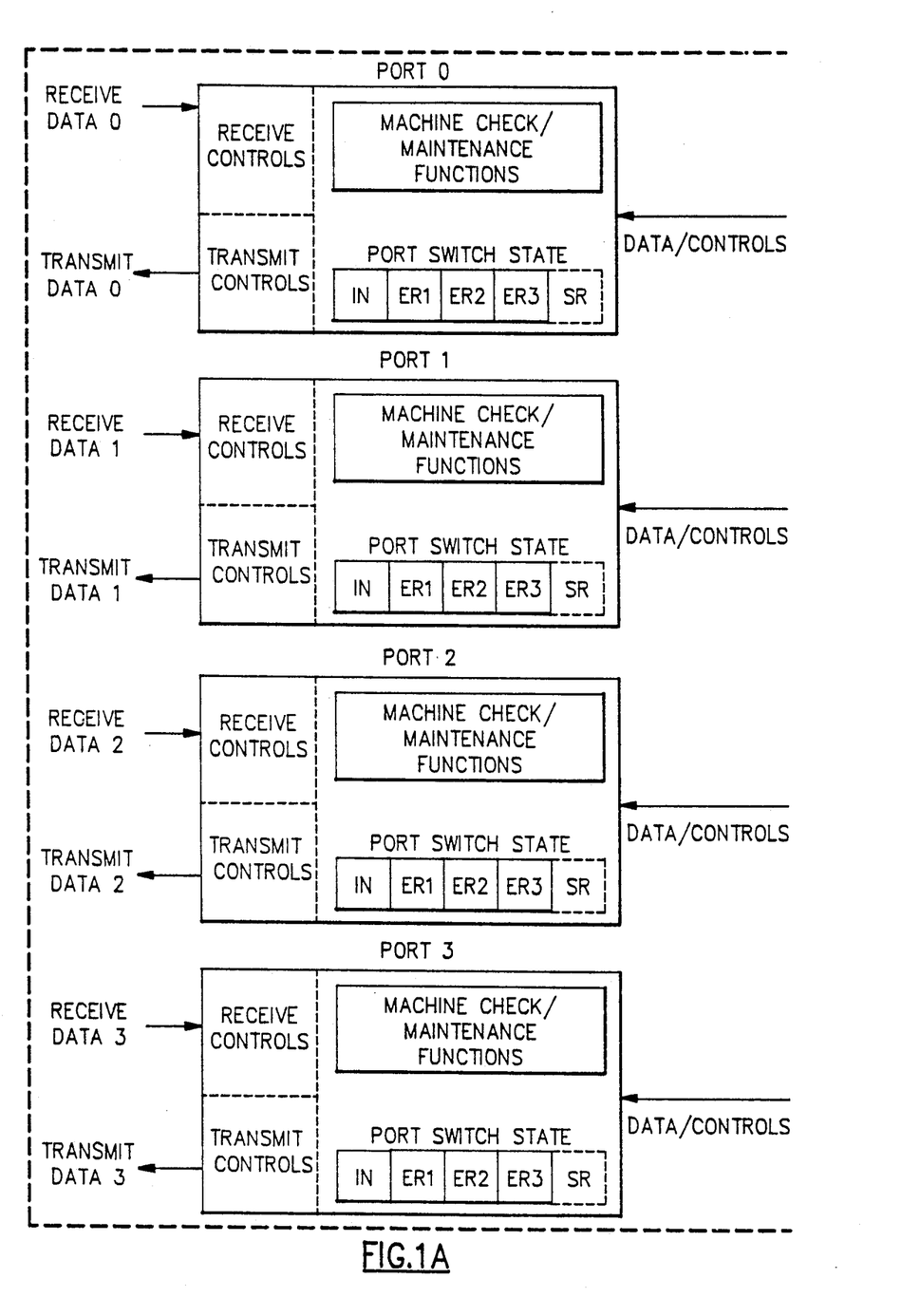
FIGS. 1A and 1B together form a high level diagram showing the interconnection between multiple channels and multiple ports in a presently preferred embodiment of the invention.
Figure 1B:
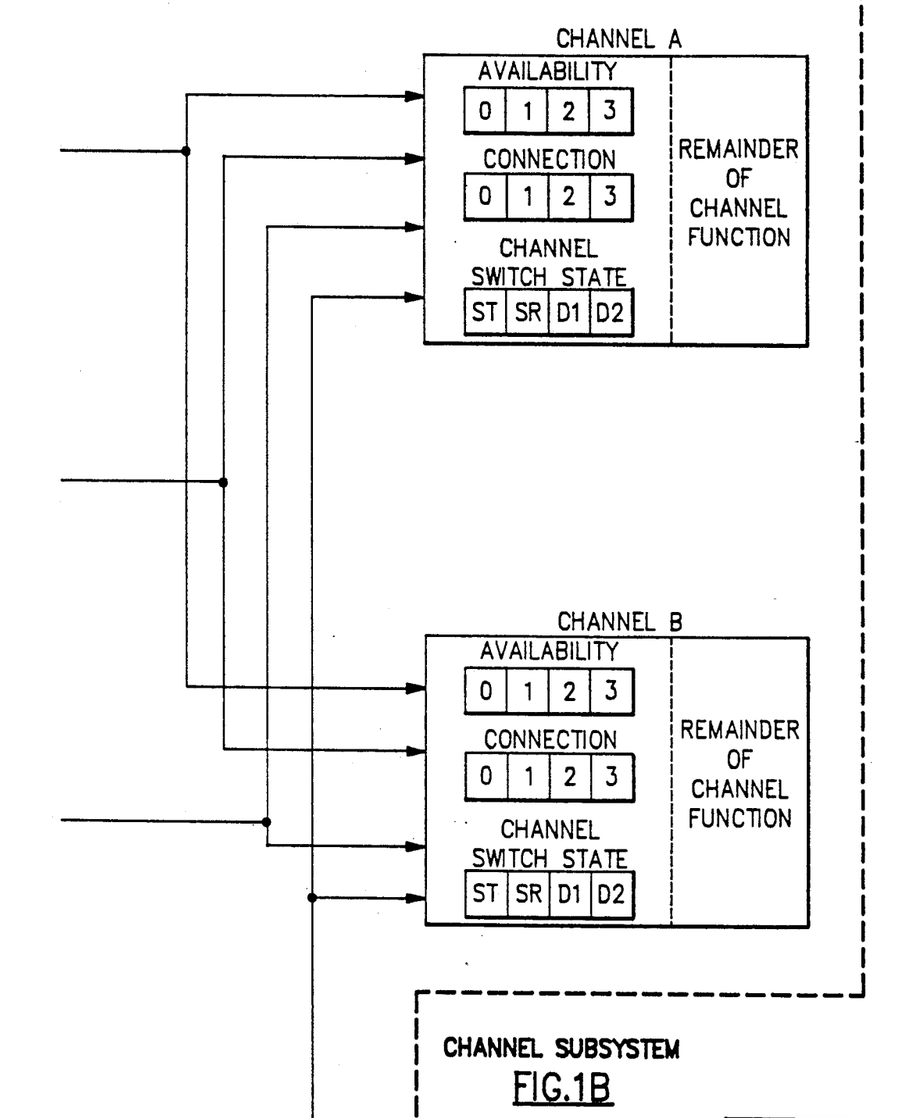
Figure 2:
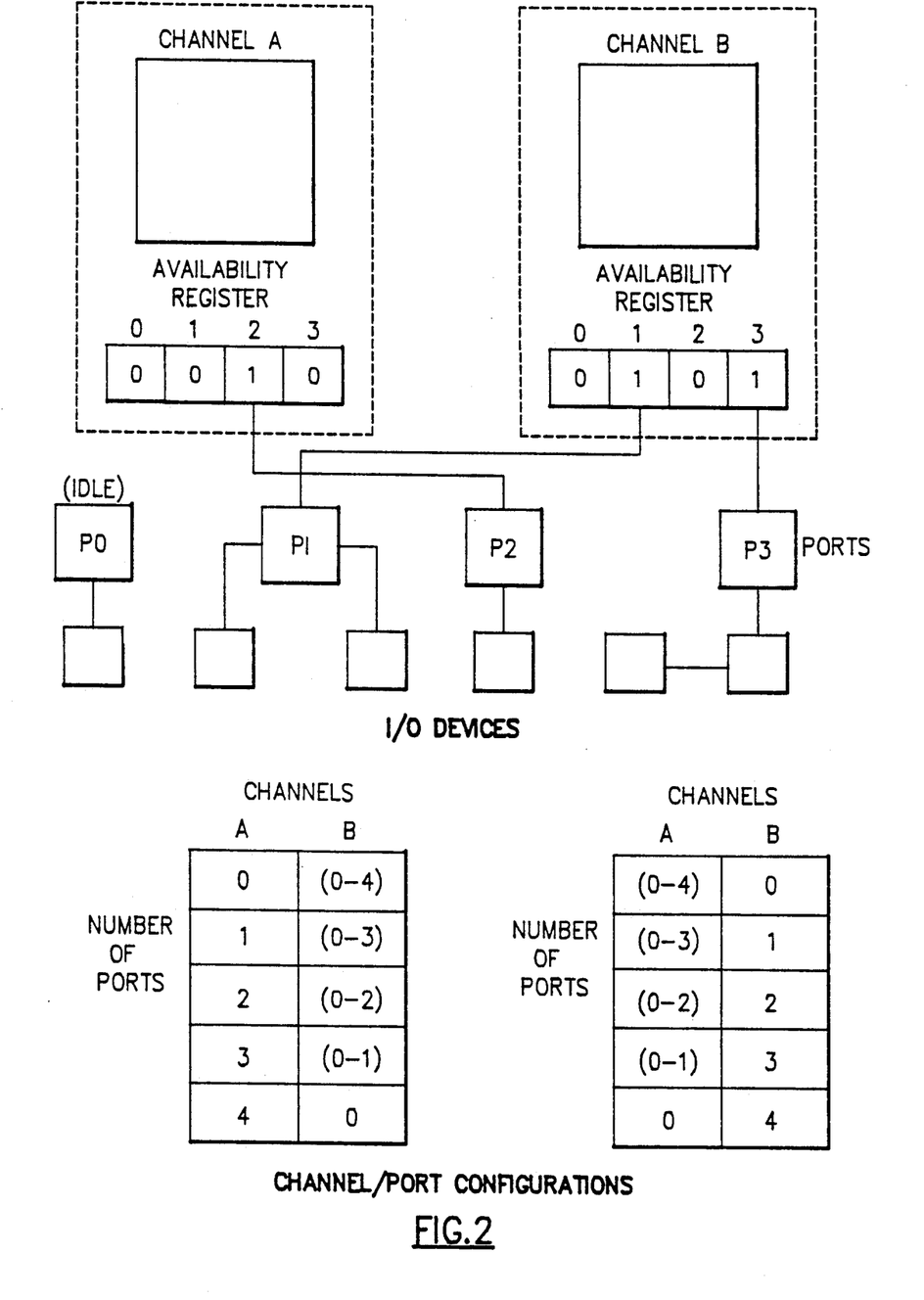
FIG. 2 is a schematic diagram and table showing two channels capable of being available on up to four interface ports.

Generally speaking, the illustrated form of the invention is in the form of a star configuration consisting of two channels capable of being available on up to four interface ports (see FIGS. 1 and 2). The division of ports between the two channels in a maximum configuration (i.e., all ports used by the two channels) can be in the following combinations: zero-four, one-three, two-two, three-one, or four-zero. Although the cases of zero-four and four-zero result in the waste of an entire channel, it is allowed due to the flexibility in the design. In the preferred embodiment, an availability scheme for allocating certain ones of the ports to only one channel is determined at initial machine load (IML) and provides for one of the ports to be constantly connected to the same channel. However, the allocation could be done dynamically if so desired.

The rule of thumb followed is that channels may have more than one interface port available for connection, but only one connection to an interface port may exist at a time for a given channel. Simply put, a channel will only be conversing on one interface at a time.

The machine check reporting process for the interface ports available on a given channel are capable of being independent from the machine check reporting process for the channel itself. When a check occurs on a port which is unconnected, the check can be logged but need not be treated as a check which would halt any channel operations. When the check occurs on a connected port, however, the check should be logged the same way as a channel check in that it actually does affect channel operations at that point in time.

Within the port, if a port check occurs, the port should take actions necessary to fence off the interfaces from any errors. For example, if a frame is being transmitted at the time of the check, it should be aborted so as to not send improper data across any interface. It should also be noted that if a port is connected to a channel, any checks occurring at the channel level should cause the port to respond as though a port check has occurred.

Reporting port checks independently of channel checks frees the channel from taking the time to recover from errors on ports which are not conversing with the channel. However, it should also be realized that if a check is occurring on a port which is unconnected, the channel implementation should call for the recovery from that check before allowing the channel to connect to that port if requested to.

The connection scheme allows a channel request for connection to a specific port to have priority over any port request for connection. For simultaneous requests for connection from multiple ports, a "least recently used" priority scheme is employed. Connection requests are honored only if no other ports are presently connected and if no activity is occurring on the specific port for which the connection is requested. Similarly, disconnection from a port may only occur when no activity is occurring on the port which is connected.

Figure 5:
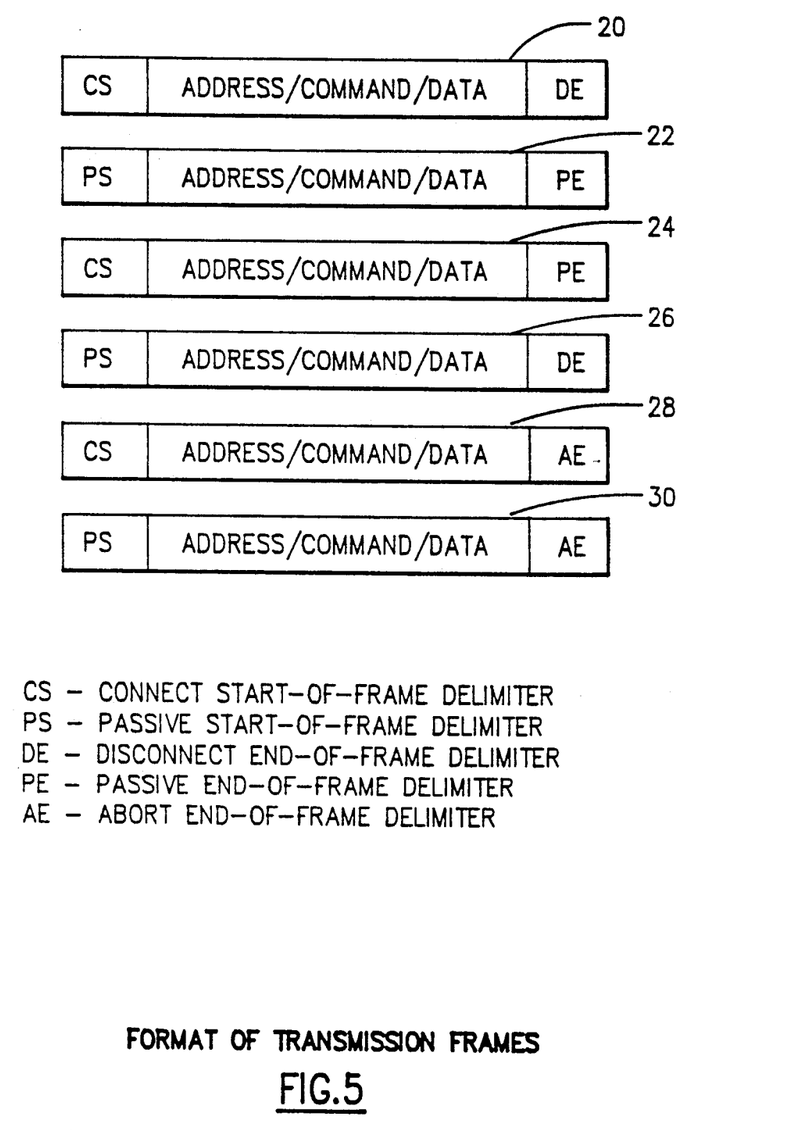
FIG. 5 shows the type of transmission frames being sent from I/O devices and/or from a channel.
Figure 6:
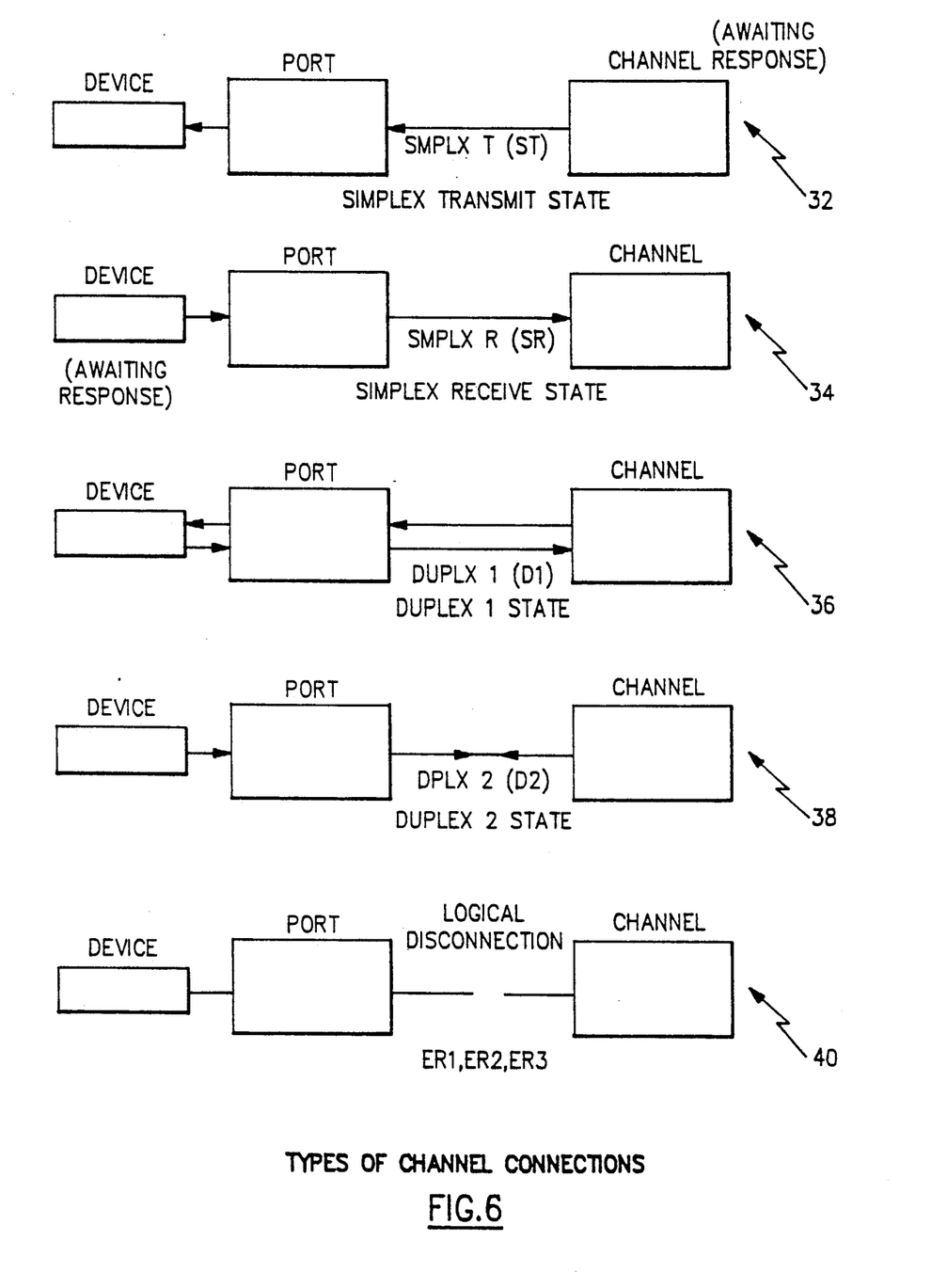
FIG. 6 illustrates some of the link levels that occur during channel/port interconnections.
Figure 7:
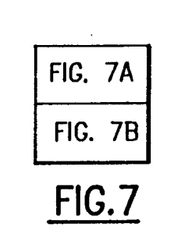
FIGS. 7 and 8 together form a table showing various internal channel switch states that occur in a presently preferred embodiment of the invention.
Figure 7A:
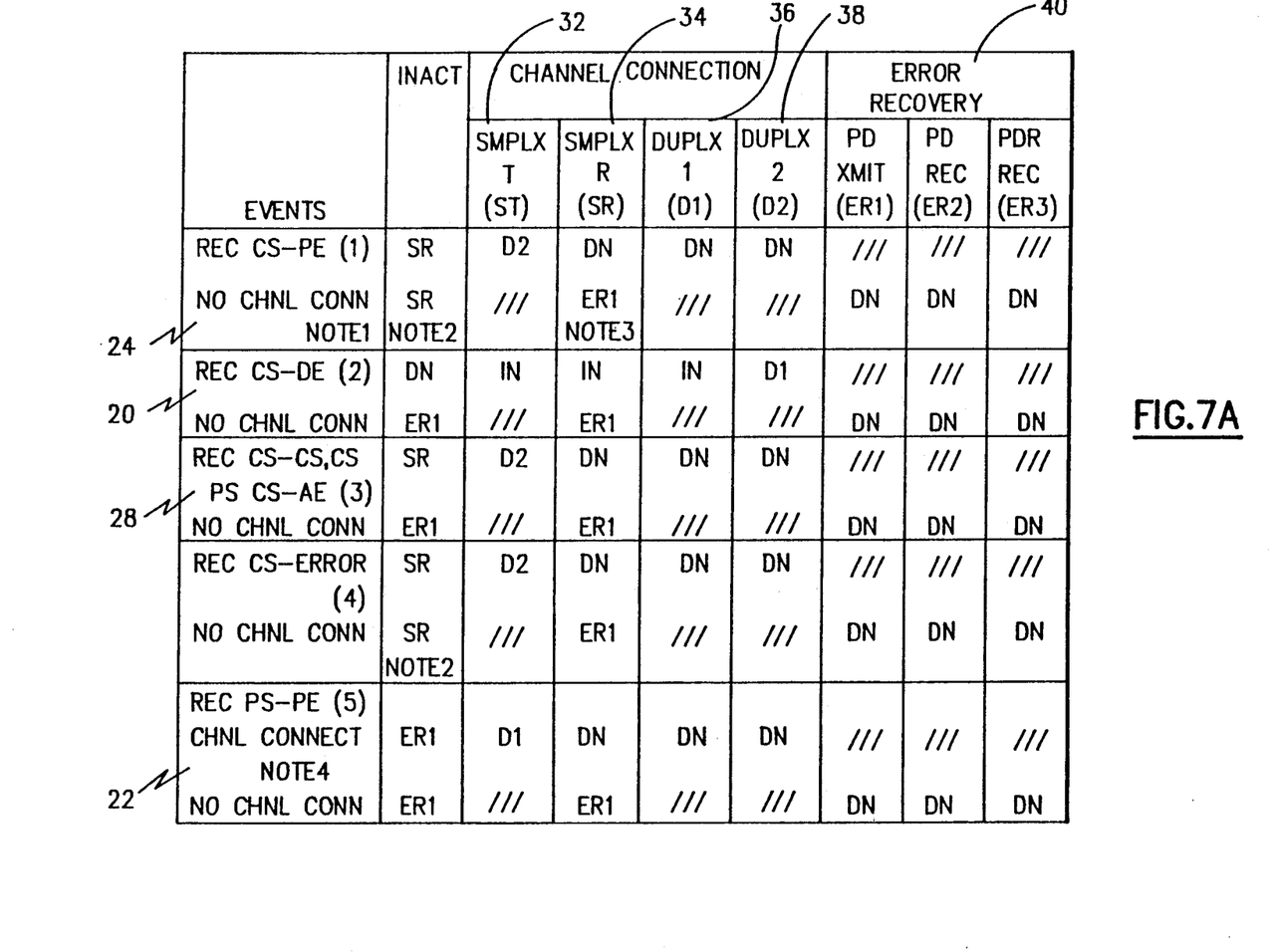
Figure 7B:
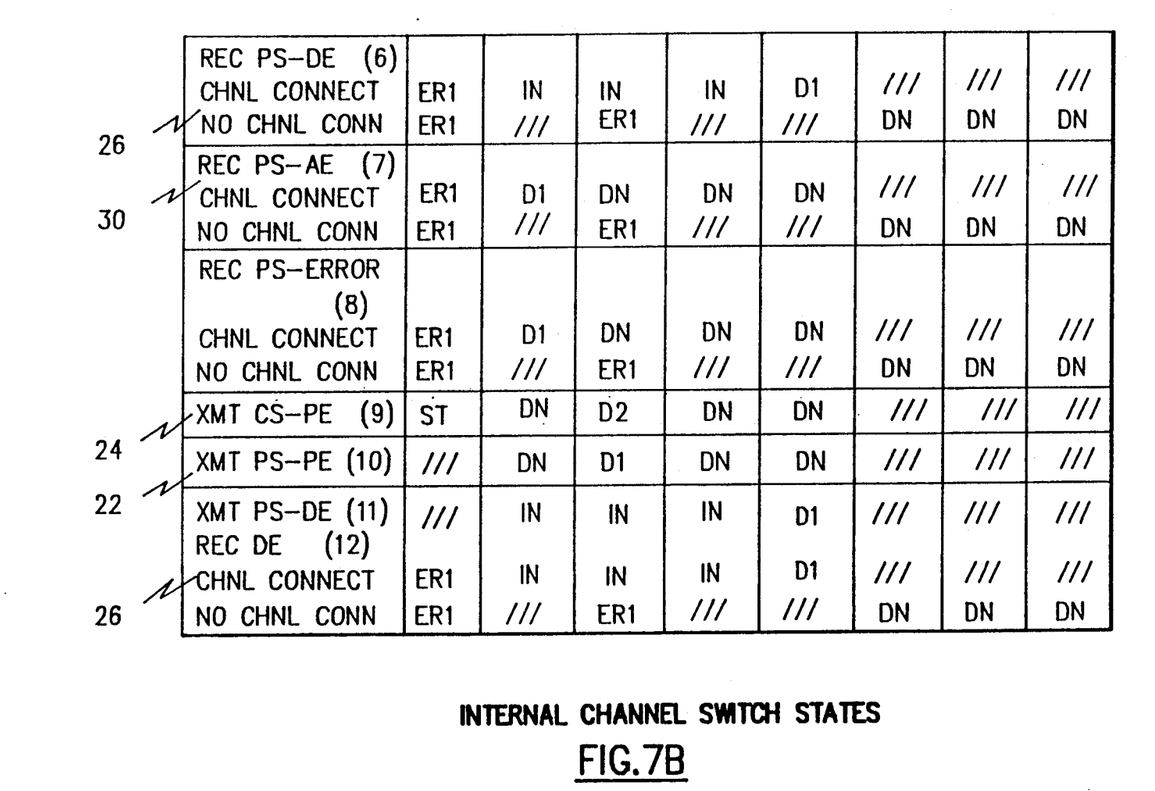
Figure 8:
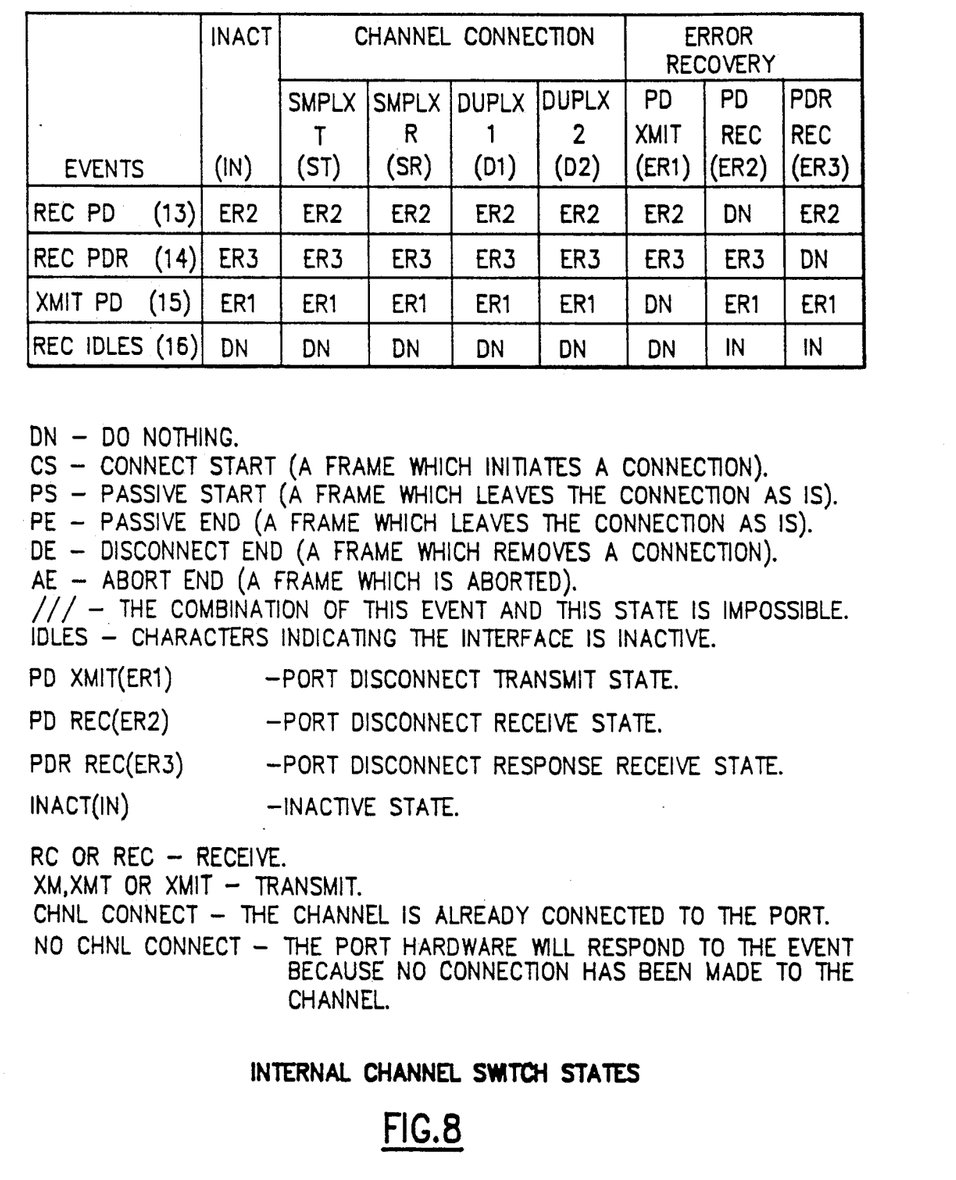
Figure 9:
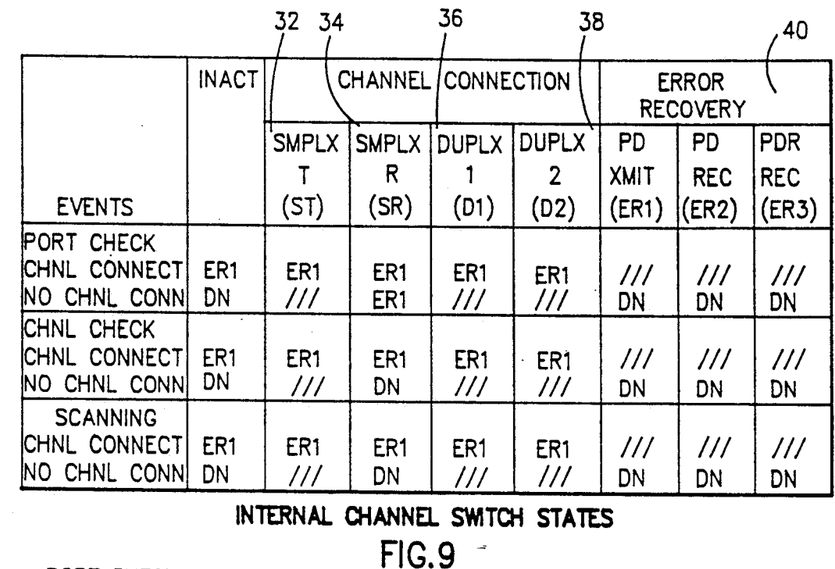
FIG. 9 is a table showing the internal channel switch states which occur in the event of a port check, or a channel check, or scanning.
Figure 10:
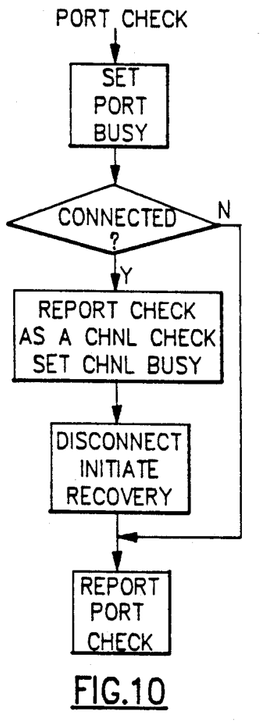
FIG. 10 is a flow chart for a port check.
Figure 11:
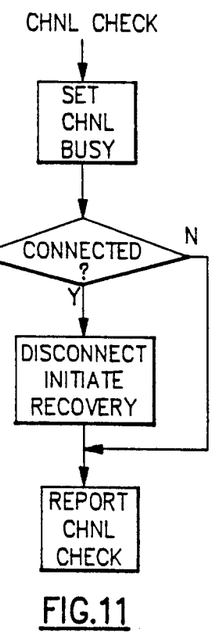
FIG. 11 is a flow chart for a channel check.
Figure 12:
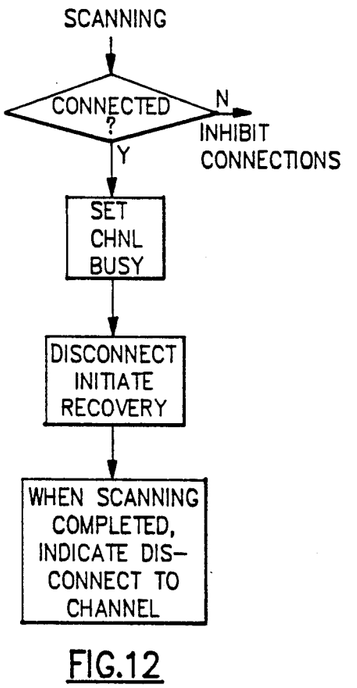
FIG. 12 is a flow chart for scanning.

Referring more specifically to the details of the preferred embodiment, some of the various terms and/or abbreviations used in the tables of FIGS. 7, 8 and 9 are illustrated in FIGS. 5 and 6. For example, the various combinations of start/end frame delimiters 20, 22, 24, 26, 28, and 30 will result in various responses from a port or channel receiving them, all depending on the switch state of the port or channel at the time the frame is received. Some of the typical types of channel/port interconnections 32, 34, 36, 38 and 40 all have direct effect on the response made in the event of a new request or the occurrence of an error.

The simplex transmit state (ST) indicates a connection was initiated by the channel but the channel has not yet received a response from the device. The simplex receive state (SR) indicates a connection was initiated by the device but the channel has not yet responded to it. The duplex 1 state (D1) indicates that a connection was made and a response given. The duplex 2 state (D2) indicates that a connection was initiated simultaneously by the device and by the channel.

In the three error conditions ER1, ER2 and ER3, the connection between the port and the channel is removed. ER1 is identified as a port disconnect transmit state (PD XMIT), and is entered if the channel must initiate error recovery. In the present embodiment, this is accomplished by transmitting a special sequence of characters to the device. ER2 is identified as a port disconnect receive state (PD REC), and is entered if the device has initiated error recovery. In the present embodiment, this is indicated by the reception of a special sequence of characters from the device. These characters are the same as those the channel transmits while in ER2. If in this state, the channel transmits a different sequence of special characters to indicate our reception of the error recovery sequence initiated by the device. ER3 is identified as a port disconnect response receive state (PDR REC), and is entered if the device is responding to the error recovery sequence initiated in the PD XMIT state. In the present embodiment, this is indicated by the reception of a special sequence of characters from the device. These characters are identical to those transmitted by the channel while in ER2. If in this state, the channel transmits idling characters which will enable the device to return to its INACTIVE state.

In the tables of internal channel switch states (FIGS. 7, 8 and 9), the EVENTS in the leftmost column are things which can occur on the interface to the device which potentially cause a change in the state. In the uppermost column headings, starting with INACT are the states. The columns labeled SMPLX T(ST) . . . PDR REC(ER3) could be considered as substates of the link-level states shown above the groups of columns. As indicated in the table, INACT(IN) has no substates associated with it. The entries in the table all indicate the next state or substate that will be entered while in the above substate if the event at the left occurs. For example, if while in the INACT(IN) state, an REC CS-PE event (event #1) occurs, the next state entered will be the SMPLX R(SR) substate of the CHANNEL CONNECTION state.

With respect to Note 1 in the table, NO CHNL CONN indicates that the occurrence of this event did not result in the connection of the channel. For this case, the port hardware must respond to the event. With respect to Note 2, the SR state entered in events 1 and 4 if NO CHNL CONN occurs while INACTIVE does not actually imply a channel connection. It could be viewed to be the virtual state of the port until the port completes its response to the device. In event 1, the port responds to the device with a BUSY frame having a PS-DE, and then returns to the INACTIVE state. In event 4, the ERROR that ends the event is not a machine check; it is an error that occurred on the interface to the device, unrelated to the port hardware or the channel hardware. The port responds to the device with a REJECT frame, also having a PS-DE, and then returns to the INACTIVE state.

With respect to Note 3 in the table, in all events where there is an entry for the SR state when there is NO CHNL CONN, the SR state is the virtual state of the port during that event. With respect to Note 4, the logic can be in the INACTIVE state and simultaneously be connected because the connect bits associated with a port do not indicate the channel has actually transmitted anything yet. When the channel requests the connection and the port becomes connected, a CHANNEL CONNECTION state will not actually be entered until a REC CS or XMT CS actually occurs.

Although it is believed that the Internal Channel Switch States table is self-explanatory when considered in conjunction with the various flow charts, some examples for making a connection will now be described. If a connection is initiated by the device, event 1 would be the first event to occur. This would take us from the INACTIVE state to the SIMPLEX R state. A normal response by the channel would be a frame having a passive start and passive end (event 10). We would enter the DUPLEX 1 state. When the I/O operation is completed, the port will be disconnected by either the transmission or reception of a disconnect end. Event 6 or 11 would accomplish this.

If the connection is initiated by the channel, the channel initially sets channel busy to prevent other ports from making a connection (see the connection routine) and then requests connection to the channel. In our embodiment channel busy is simply a latch which will prevent any device initiated connection if no connection presently exists. If the connection is granted, the state will remain INACTIVE until an actual XMT CS is sent. However, the connection bit will be on. Event 9 should occur next and change the state to SIMPLEX T. Event 5 would take us into the DUPLEX 1 state. And as before, event 6 or 11 would disconnect us.

Some more unusual scenarios will now be described. All events which cause ER1 to be entered are conditions which call for error recovery. When ERI is entered, the port transmits a sequence called the port disconnect special sequence (PD). A handshaking process now occurs. The port expects to receive a port disconnect response (PDR) sequence in response to the PD sequence (ER3)(event 14). The channel will transmit idle characters while in ER3 and expects to receive idle characters then as the device response. Thus, while in ER3, reception of idle characters takes us to INACTIVE (event 16). If the device transmits a sequence (ER2)(event 13), the response will be the PDR sequence. When idle characters are received (event 16), the INACTIVE state occurs.

Another rather special sequence of events would occur if event 1 were followed by event 9. This would occur if the channel was preparing to initiate a connection and did not see that the deviced initiated the connection first. This would result in the DUPLEX 2 state. It can be seen that in this state it would take two disconnect ends (DE) before the INACTIVE state would be entered again. The same thing would happen if event 9 occurred prior to event 1. If they occurred simultaneously, we would never go into either simplex state, but would change immediately from INACTIVE to DUPLEX 2.

For event 3, a CS-CS or CS-PS simply implies that the end-of-frame delimiter may have been lost during transmission, and the present frame was ended by receiving another start-of-frame delimiter.

Whenever the SR state is entered virtually (event 1 or 4, if NO CHNL CONN), the port will be sending either a busy or a reject frame independent of the channel's knowledge. This will cause the device to disconnect because these frames have a PS-DE. If any other event occurs before the DE is sent, the port will do error recovery.

Figure 3:
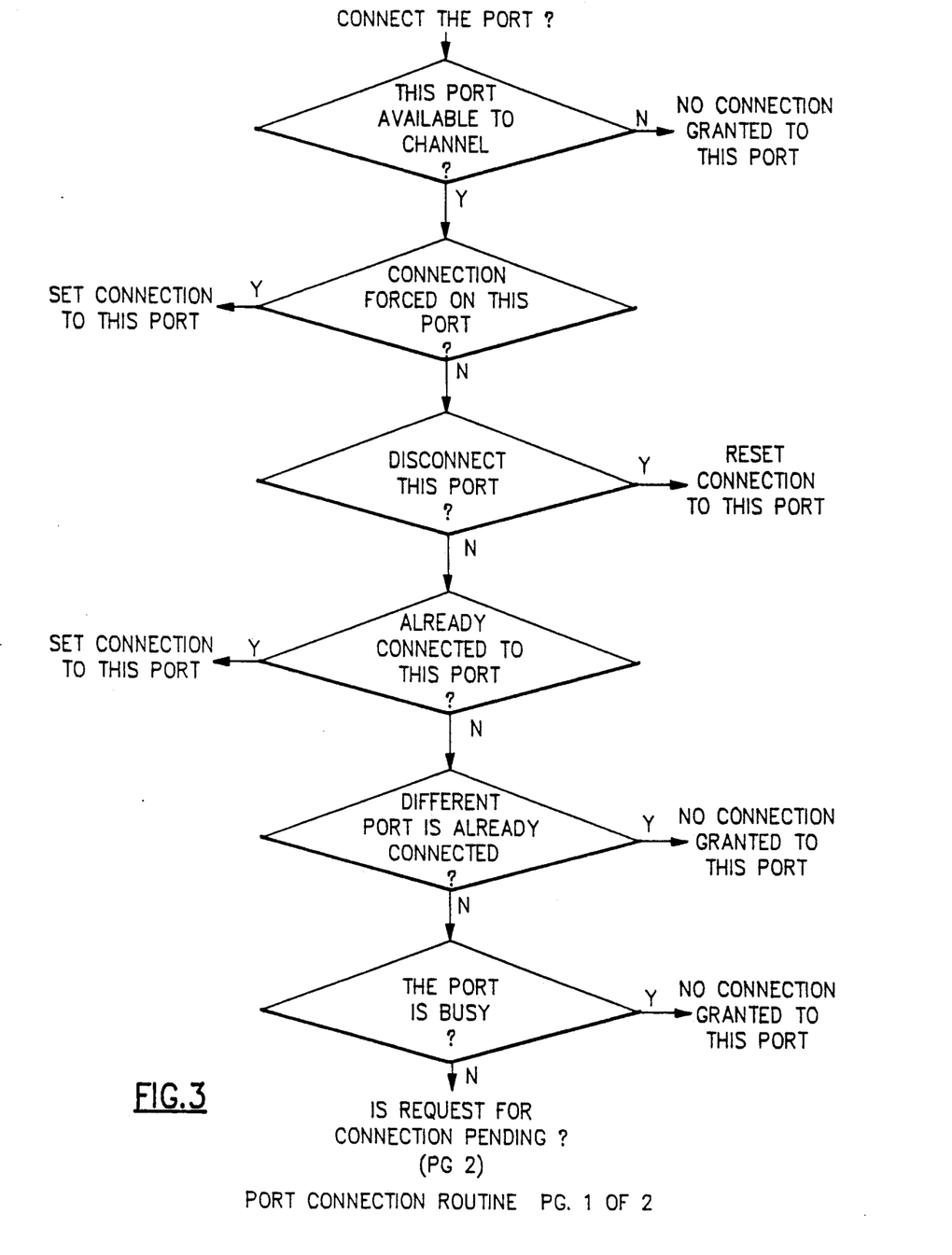
FIGS. 3 and 4 are a flow chart showing a typical port connection routine.
Figure 4:
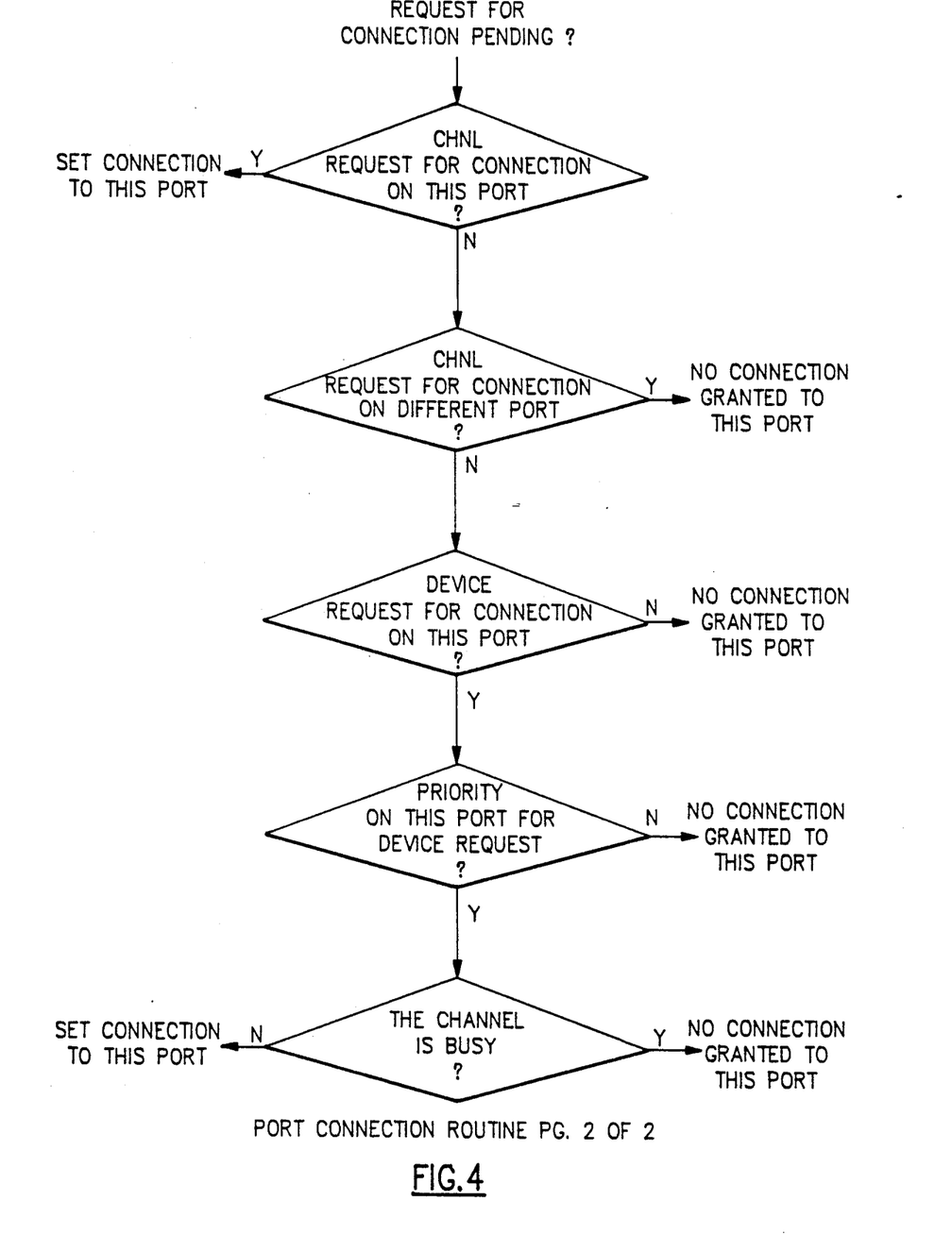

Referring now to FIGS. 3 and 4, the port connect routine occurs on every clock cycle of the channel and occurs independently on each port. The decisions shown on FIG. 3 are done before checking to see if a request for connection is occurring from the channel or the port—these are taken care of as shown in FIG. 4. Referring to FIG. 4, it is clear that the channel has the highest priority when granting connections. Also, priority for simultaneous device requests is determined on a "least recently used" basis.

It is to be noted that a port might be busy for a couple of reasons. The most likely would be that it is transmitting a busy or reject frame or it might be doing error recovery with the device. Regardless, it is impossible to make a connection then. With respect to a channel being busy, a channel busy is a signal set by the channel to prevent ports from gaining access via a connection. This allows the channel to control the setting of the connection bits on the ports which are available to it. If a connection already exists, (i.e., the port was granted a connection before the channel busy was set), the connection will remain until properly removed.

As best shown in FIGS. 9-12, the invention contemplates disconnects of the port from the channel when either a channel check occurs or a port check or scanning occurs. In this regard, the scanning which is done in the central computer system and related channel subsystems for purposes of maintenance and diagnostics does not affect various functions performed in the ports.

In view of all the foregoing, it will be apparent to those skilled in the art that various changes and modifications are possible in order to implement the features of the invention. Such variations are not to be regarded as a departure from the spirit and scope of the invention, and all such modifications as would be obvious to one skilled in the art are intended to be included within the scope of the following claims.

We claim as our invention:

1. In a computer input/output (I/O) system for connecting a computer to a plurality of peripheral devices, said I/O system being of the type having:
  (1) a plurality of ports, each port of said plurality of ports being disposed for connection through an I/O interface to one or more of said plurality of peripheral devices for transfer of information,
  (2) a plurality of channels, each channel of said plurality of channels having:
    (2.1) a channel busy means for indicating a channel busy or non-busy channel sate of said each channel,
    (2.2) a plurality of port busy means, each port busy means of said plurality of port busy means being for indicating a port busy or port non-busy state of a corresponding one said port of said plurality of ports,
    (2.3) connection means coupled to said channel busy means and said port busy means for connecting said each channel to one said port of said plurality of ports and for disconnecting said each channel from said one port of said plurality of ports in response to indication by said port busy means or said channel busy means of at least one said channel busy state, and (2.4) check means coupled to said connection means for indicating one or more check conditions, said check conditions including channel check conditions in said each channel or port check conditions in any said port of said plurality of ports that is connected to said each channel or both, and (3) recovery means coupled to said plurality of channels and to said plurality of ports for performing an error recovery process responsive to indication by said check means of at least one said check condition, a method for error isolation and recovery, comprising the steps of:

(a) connecting a first port of said plurality of ports to at least one peripheral device of said plurality of peripheral devices and connecting a first channel of said plurality of channels to said first port for transfer of information between said first channel and said at least one connected peripheral device;

(b) initiating said transfer of information;

(c) providing a check indication at said check means in said first channel in response to said port check condition in said first port or said channel check condition in said first channel;

(d) in response to said check indication, transferring from said first channel through said first port to said at least one connected peripheral device an abort-end-of-frame delimiter for denoting abortion of said transfer of information;

(e) conditioning said channel busy means in said first channel to said channel busy state in response to said check indication;

(f) if said check indication denotes a port check condition, conditioning said port busy means in said first channel to said port busy state corresponding to said first port in response to said port check indication;

(g) disconnecting said first channel from said first port; and (h) initiating said error recovery process in said recovery means in response to said check indication.

2. The method of claim 1 wherein said conditioning step (e) comprises the additional steps of:

(e1) transferring, from said first channel to said first port, channel control information denoting that said initiating step (h) is to be performed by said first channel only if said check indication denotes a channel check condition and otherwise said initiating step (h) is to be performed by a second said channel of said plurality of channels; and (e2) performing said initiating step (H) in response to said channel control information.

3. The method of claim 1 wherein said second conditioning step (f) comprises the additional steps of:

(f1) transferring, from said first port to said first channel, port control information denoting that said initiating step (h) is to be performed by said first port or by said at least one connected peripheral device only if said check indication denotes a port check condition and otherwise said initiating step (h) is to be performed by a second said port of said plurality of ports; and (f2) performing said initiating step (h) in response to said port control information.

4. The method of claim 1 wherein said first conditioning step (e) comprises the additional steps of:

(e1) transferring, between said first channel and said first port, handshaking information including first information denoting that said initiating step (h) is to be performed by said first channel only if said check indication denotes a channel check condition, otherwise said initiating step (h) is to be performed by a second said channel of said plurality of channels, and second information denoting a handshaking response to said first information; and (e2) performing said initiating step (h) in response to said second information.

5. The method of claim 1 wherein said second conditioning step (f) comprises the additional steps of:

(f1) transferring, between said first port and said first channel, handshaking information including first information denoting that said initiating step (h) is to be performed by said first port or by said at least one connected peripheral device only if said check indication denotes a port check condition, otherwise said initiating step (h) is to be performed by a second said port of said plurality of ports, and second information denoting a handshaking response to said first information; and (f2) performing said initiating step (h) in response to said second information.

* * * * *

UNITED STATES PATENT AND TRADEMARK OFFICE
CERTIFICATE OF CORRECTION

PATENT NO. : 5,303,351
DATED : April 12, 1994
INVENTOR(S) : Jackowski, et. al.

It is certified that error appears in the above-indentified patent and that said Letters Patent is hereby corrected as shown below:

On the Title page, item [54], and col. 1, line 1, Title, should read--
"ERROR RECOVERY IN A MULTIPLE I/O CHANNEL COMPUTER SYSTEM"

Signed and Sealed this

Eleventh Day of October, 1994

Attest:

BRUCE LEHMAN

*Attesting Officer*      *Commissioner of Patents and Trademarks*